(12) United States Patent
Hazan et al.

(10) Patent No.: US 8,944,012 B2
(45) Date of Patent: Feb. 3, 2015

(54) APPARATUSES, SYSTEMS AND METHODS FOR CATCHING CANINE FECES

(71) Applicant: Piqapoo Ltd., Tel Aviv (IL)

(72) Inventors: Re'em Hazan, Zur Hadassa (IL); Moshe Hazan, Zur Hadassa (IL)

(73) Assignee: Piqapoo Ltd., Tel Aviv (IL)

( * ) Notice: Subject to any disclaimer, the term of this patent is extended or adjusted under 35 U.S.C. 154(b) by 0 days.

(21) Appl. No.: 13/967,559

(22) Filed: Aug. 15, 2013

(65) Prior Publication Data

US 2013/0327283 A1 Dec. 12, 2013

Related U.S. Application Data

(63) Continuation-in-part of application No. 13/681,683, filed on Nov. 20, 2012, now abandoned, which is a continuation of application No. 13/061,520, filed as application No. PCT/IL2009/000837 on Sep. 1, 2009, now Pat. No. 8,342,138.

(60) Provisional application No. 61/093,731, filed on Sep. 3, 2008.

(51) Int. Cl.
 *A01K 23/00* (2006.01)
(52) U.S. Cl.
 CPC ........................................ *A01K 23/00* (2013.01)
 USPC ........................................... 119/868; 119/867
(58) Field of Classification Search
 CPC .... A01K 23/00; A01K 27/002; E01H 1/1206; A61F 5/445; A61F 5/448; A61F 5/451; A61F 5/44; A61F 5/4408; A61F 2005/4402; A61F 5/455; A61F 5/449
 USPC ................. 119/867, 868, 869, 856, 171, 174; 604/338, 332, 327, 342, 339
 See application file for complete search history.

(56) References Cited

U.S. PATENT DOCUMENTS

| | | | | |
|---|---|---|---|---|
| 3,656,459 A * | 4/1972 | Missud | | 119/868 |
| 3,875,903 A * | 4/1975 | Sarvary | | 119/868 |
| 5,315,960 A * | 5/1994 | Lamp | | 119/868 |
| 5,386,802 A * | 2/1995 | Hang-Fu | | 119/868 |
| 5,819,691 A * | 10/1998 | Lavi et al. | | 119/868 |
| 6,394,041 B1 * | 5/2002 | Katz | | 119/868 |
| 6,494,168 B2 * | 12/2002 | Weng | | 119/868 |
| 6,722,319 B1 * | 4/2004 | Chiu | | 119/868 |
| 6,941,897 B1 * | 9/2005 | Rosales | | 119/868 |
| 8,015,949 B2 * | 9/2011 | Dolub | | 119/868 |
| 2008/0076989 A1 * | 3/2008 | Hete et al. | | 600/323 |
| 2008/0127909 A1 * | 6/2008 | Albalas et al. | | 119/868 |

\* cited by examiner

*Primary Examiner* — Trinh Nguyen
(74) *Attorney, Agent, or Firm* — Vladimir Sherman; Professional Patent Solutions (57) ABSTRACT

The present invention includes apparatuses, systems and methods for collecting canine feces. According to some embodiments of the present invention, there may be provided a device which may attach to a tail of a dog and may collect, possibly in a disposable receptacle, feces exiting the dog's anus, as the dog defecates normally. The device may be designed such that when the device is attached the tail of a dog, the opening of the receptacle collocates directly behind the anus of the dog, and may further be encouraged by tension towards the anus of the dog, thereby ensuring that any feces exiting the anus of the dog enters the receptacle directly.

18 Claims, 14 Drawing Sheets

APPARATUSES, SYSTEMS AND METHODS FOR CATCHING CANINE FECES

PRIORITY CLAIMS

This application is a continuation in part of: U.S. patent application Ser. No. 13/681,683, filed on Nov. 20, 2012 by the inventors of the present application and titled: "Dog Waste Catcher";

U.S. patent application Ser. No. 13/681,683, is a continuation application of U.S. patent application Ser. No. 13/061,520, filed on Mar. 1, 2011 by the inventors of the present application and titled: "Dog Waste Catcher", and issued as U.S. Pat. No. 8,342,138 on Jan. 1, 2013;

U.S. patent application Ser. No. 13/061,520, is a U.S. National Stage application of International Application PCT/IL2009/0000837, filed on Sep. 1, 2009 by the inventors of the present application and titled: "Dog Waste Catcher";

International Application PCT/IL2009/0000837 claims the benefit of US Provisional Application No. 61/093,731, filed on Sep. 3, 2008;

all of the aforementioned applications are hereby incorporated herein by reference in their entirety.

FIELD OF THE INVENTION

The present invention generally relates to the field of pet accessories. More specifically, the present invention relates to apparatuses, systems and methods for catching canine feces.

BACKGROUND

With the joys of having a pet, comes the responsibility of taking care of that pet and cleaning-up after the animal, particularly in public places. In urban areas and suburban neighborhoods animal excrement littering the streets, parks, and yards has become a serious problem. This animal excrement, particularly from dogs, creates an unpleasant and unhealthy living environment. Many jurisdictions now have laws and regulations which provide for fines for owners of dogs who do not clean up after the animal. At the same time, cleaning up canine feces can be quite an unpleasant chore. Any dog owner would likely agree that it would be nice if the dog excrement could politely make its way to the nearest trash receptacle on its own.

In fact, there are numerous prior art devices designed to collect canine excrement, including a few attempts to contain the excrement before it reaches the ground, thereby making cleanup simple, easy and hygienic (for example see U.S. Pub. No. 2008/0127909 to Albalas et. al). So far, however, these devices are not very practical and further are uncomfortable for the dog, causing the dog to resist their implementation (for example the Albalas application cited above requires the device be adhered to the dog's fur). What is needed is a simple device which can easily be placed on the animal, comfortably, without interfering with the dogs natural habits, and easily removed. A device that would be small, compact, light weight, easy to carry when not in use and providing for quick, easy and clean disposal of the excrement. At the same time, the device should be designed to catch all the excrement cleanly.

SUMMARY OF THE INVENTION

The present invention includes apparatuses, systems and methods for catching canine feces. According to some embodiments of the present invention, there may be provided a device which may attach to a tail of a dog and may collect, possibly in a disposable receptacle, feces exiting the dog's anus, as the dog does its business normally. The device may be designed such that when the device is attached to the tail of a dog, the opening of the receptacle collocates directly behind the anus of the dog, and may further be encouraged by tension towards the anus of the dog, thereby ensuring that any feces exiting the anus of the dog enters the receptacle directly. According to further embodiments, the receptacle may be easily detachable from the device, such that once the dog has completed his/her business, the receptacle may easily and cleanly be detached from the device and discarded. Examples of such devices are disclosed in U.S. patent application Ser. No. 13/681,683, of which this Application is a continuation in part. U.S. patent application Ser. No. 13/681,683 is hereby incorporated into the present Application in its entirety.

According to some embodiments, there may be provided an apparatus for catching canine feces (hereinafter referred to as a "Piqapoo™"). A Piqapoo may be comprised of:
  a. a tail attaching element designed to detachably attach to a tail of a dog, e.g. a clip;
  b. a receptacle, possibly disposable, designed to receive and collect feces, e.g. a bag type receptacle. The receptacle may initially be in a folded/compact state and enlarge when feces enters the receptacle, as needed (similar to a garbage bag);
  c. a receptacle mount designed to support/secure the receptacle. The receptacle mount may include an opening and may support/secure a receptacle such that the receptacle opening coincides with the receptacle mount opening. According to further embodiments, a receptacle may be manufactured and attached to a receptacle mount during fabrication (e.g. adhered), such that a user may purchase the receptacle mount and receptacle as a single integral unit;
  d. a connecting element designed to detachably connect a receptacle mount to a tail attaching element, such that when the tail attaching element is attached to a tail of a dog and the receptacle mount is attached to the tail attaching element the receptacle mount opening, and accordingly the receptacle opening, are positioned directly behind the anus of the dog. According to some embodiments, a connecting element may be fixed to a tail attaching element, possibly during manufacture of the apparatus;
  e. a tension element designed to encourage, by tension, the receptacle mount opening, and accordingly the receptacle opening, towards the anus of the dog. The tension element may be a separate element or it may be an integral part of the tail attaching element, the connecting element, or the receptacle mount. According to further embodiments, the tail attaching element, the connecting element, the receptacle mount or portions thereof, may be comprised of a flexible material, such that, by nature, they may serve as the tension element when attached in place.

According to some embodiments, a method for collecting dog feces may comprise:
  a. connecting a receptacle to a receptacle mount—as stated above, this step may be performed during manufacture of the product;
  b. connecting the receptacle mount to a tail attachment element, possibly by means of a connector as described above;
  c. attaching the tail attaching element to a tail of a dog, such that the receptacle mount opening, and accordingly the receptacle opening, are positioned directly behind the anus of the dog and encouraged by the tension element towards the anus of the dog;

d. waiting for the dog to defecate—upon the dog defecating the excrement will enter the receptacle which will in turn enlarge to the necessary proportions and collect the feces;

e. detaching the tail attaching element from the tail of the dog;

f. detaching the receptacle mount from the tail attaching element and discarding the receptacle, and voila!

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

*it should be noted that in FIGS. 2A-2E the exemplary connector of the piqapoo is illustrated in its open position for clarity

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

In the following detailed description references to the figures appear in brackets. Numbers or letters appearing in brackets, e.g. [800], excluding paragraph numbers, should be understood to refer to elements marked within the figures by the same number or letter which appears in the brackets.

The present invention includes apparatuses, systems and methods for collecting canine feces. According to some embodiments of the present invention, there may be provided a device which may attach to a tail of a dog and may collect, possibly in a disposable receptacle, feces exiting the dog's anus, as the dog defecates normally [see FIG. 1]. The device may be designed such that when the device is attached the tail of a dog, the opening of the receptacle collocates directly behind the anus of the dog, and may further be encouraged by tension towards the anus of the dog, thereby ensuring that any feces exiting the anus of the dog enters the receptacle directly. According to further embodiments, the receptacle may be easily detachable from the device, such that once the dog has completed his/her business, the receptacle may easily and cleanly be detached from the device and discarded.

Figure 1:
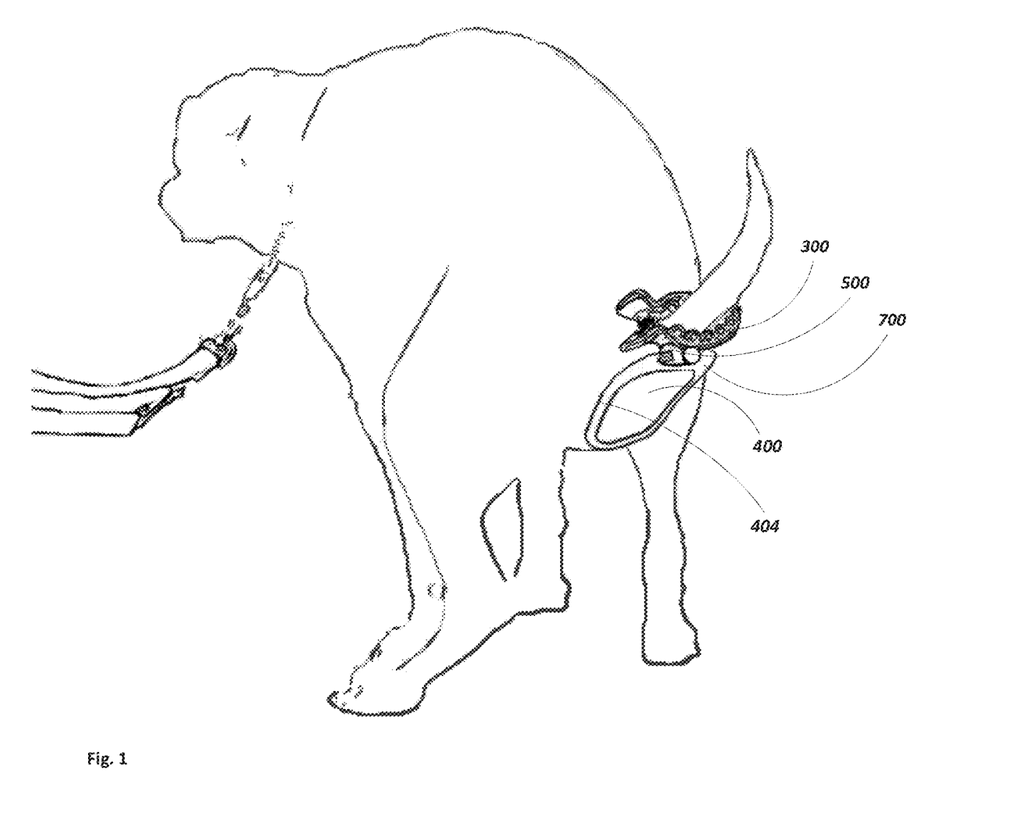
FIG. 1 is an illustration of an exemplary piqapoo attached to a dog, in accordance with some embodiments of the present invention.
Figure 2A:
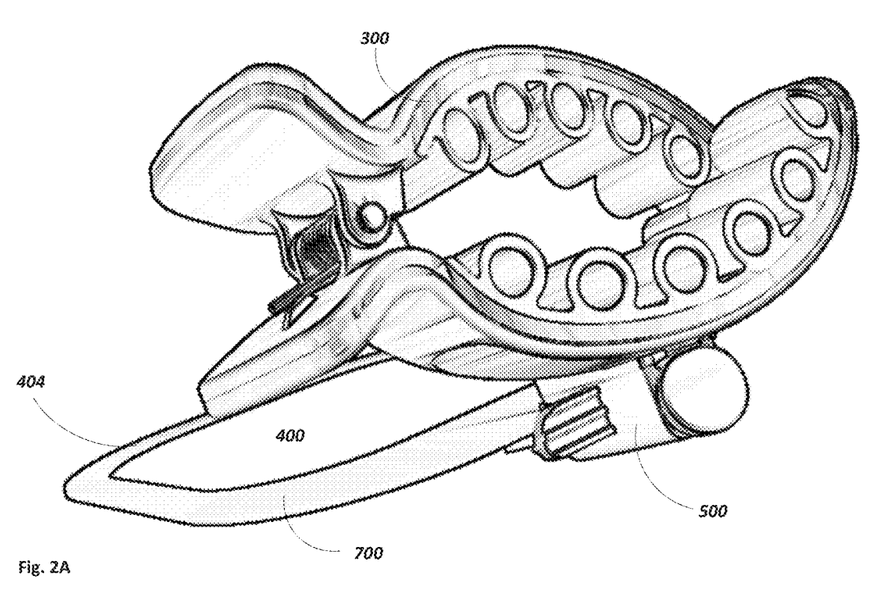
FIGS. 2A-2E: are illustrations of an exemplary complete piqapoo, from different angles, all in accordance with some embodiments of the present invention.
Figure 2B:
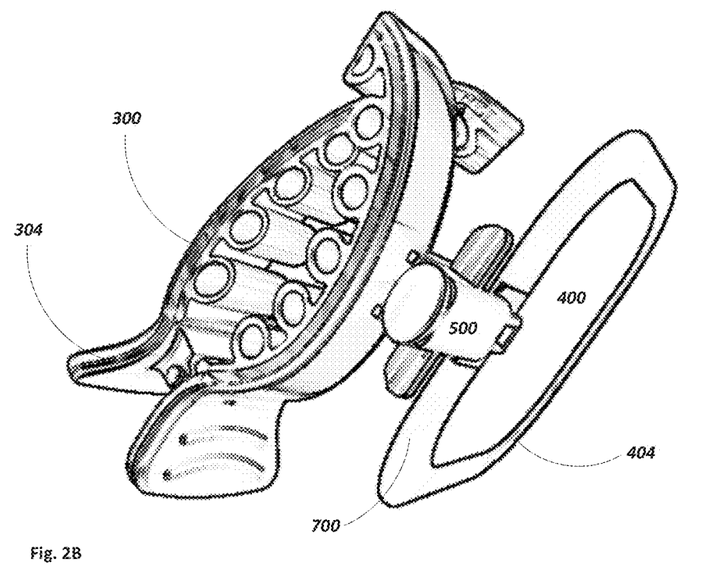
Figure 2C:
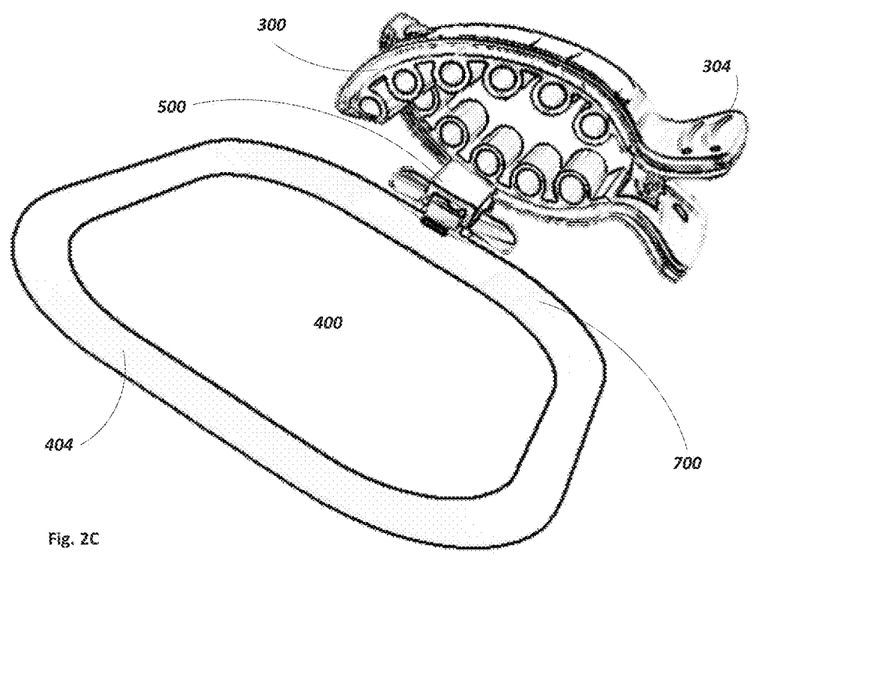
Figure 2D:
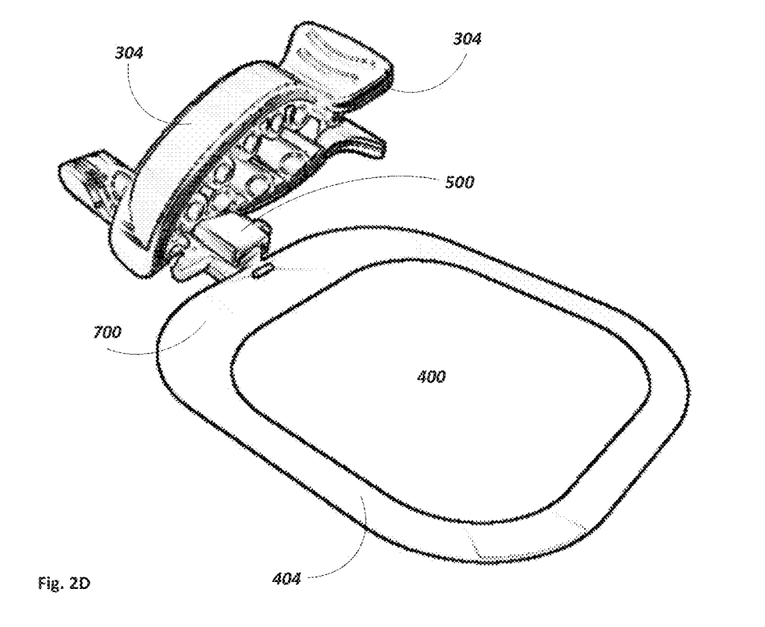
Figure 2E:
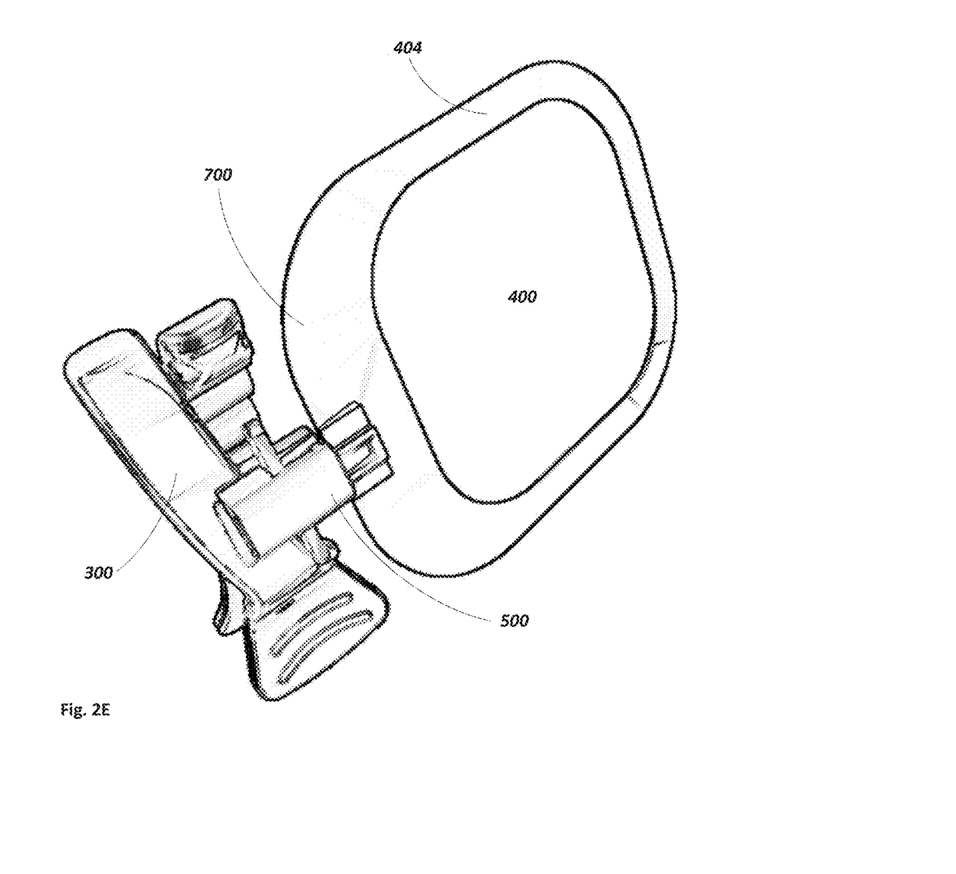
Figure 3A:
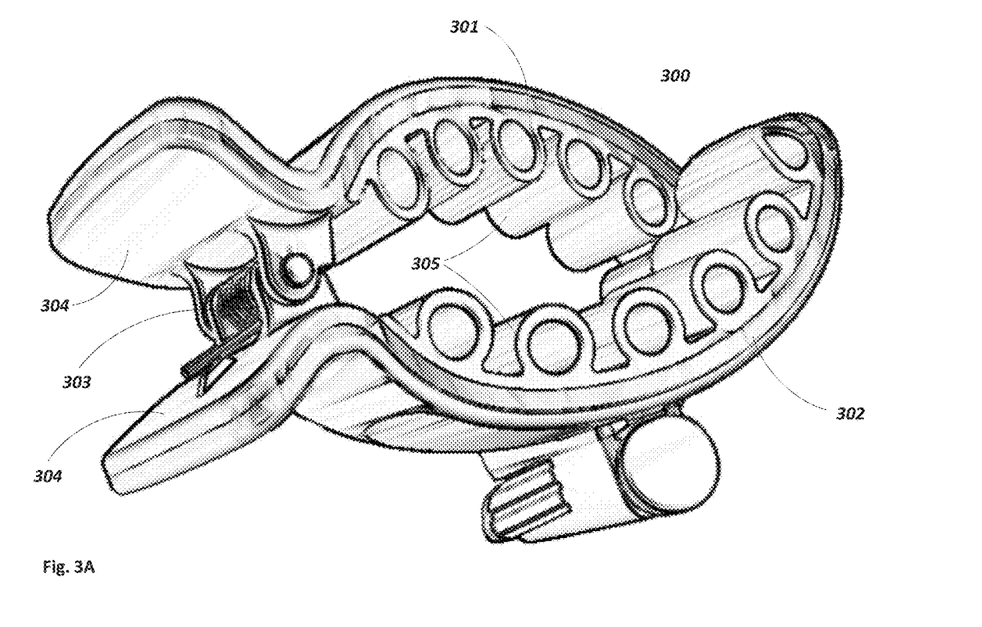
FIG. 3A: is an illustration of an exemplary tail attachment element, in an open and closed position, all in accordance with some embodiments of the present invention.
Figure 3B:
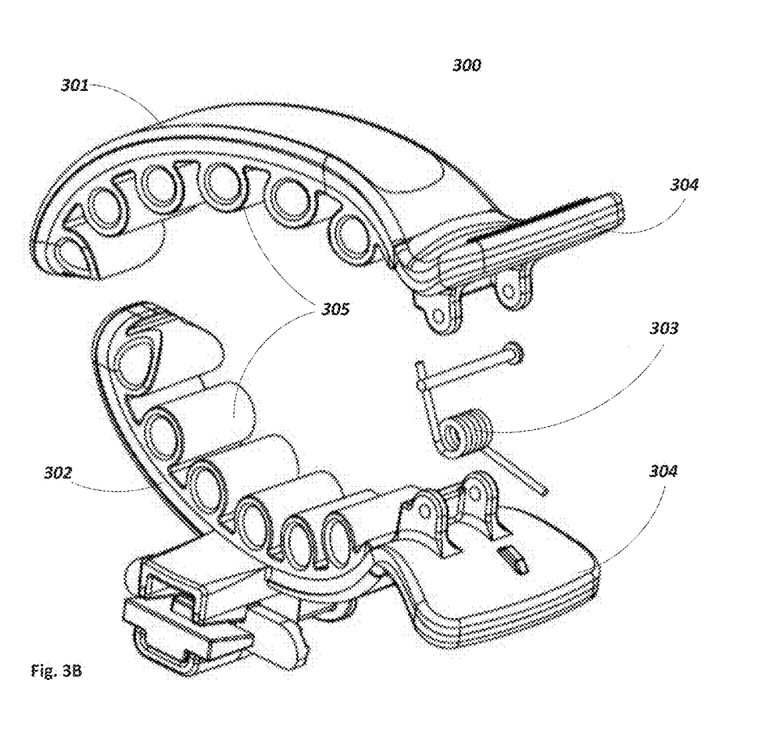
FIG. 3B: is an illustration of components of an exemplary tail attachment element, in accordance with some embodiments of the present invention.
Figure 4A:
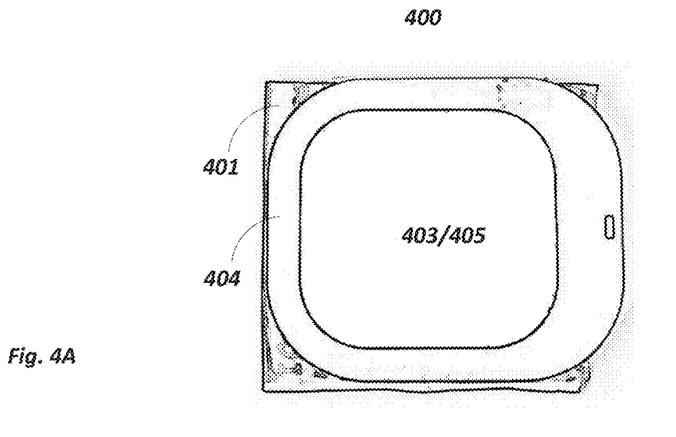
FIGS. 4A-4B: are illustrations of an exemplary receptacle and an exemplary receptacle mount, wherein the receptacle is affixed to the receptacle mount, all in accordance with some embodiments of the present invention.
Figure 4B:
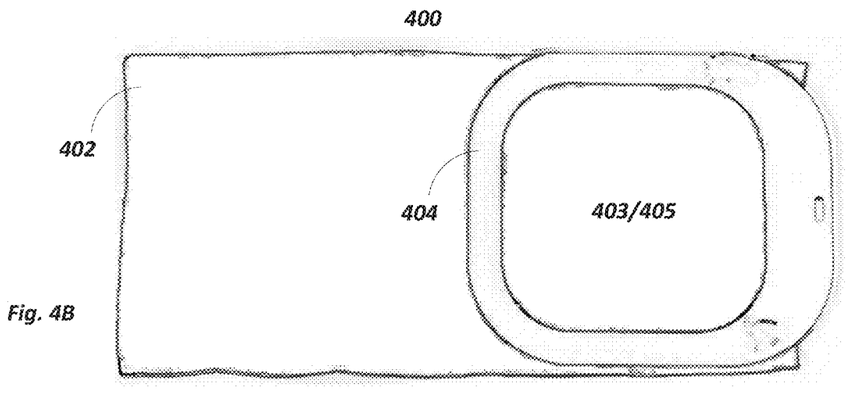
Figure 4C:
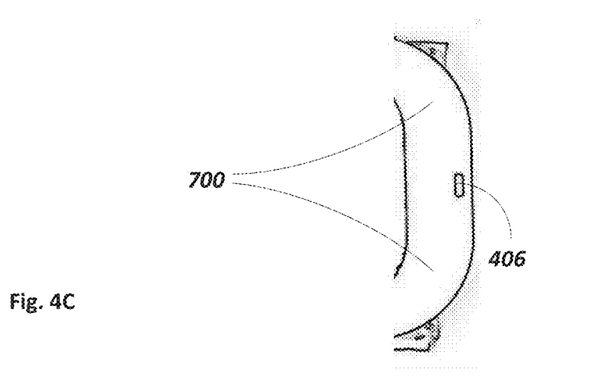
FIG. 4C: is an illustration of the top portion of an exemplary receptacle mount, in accordance with some embodiments of the present invention.
Figure 5A:
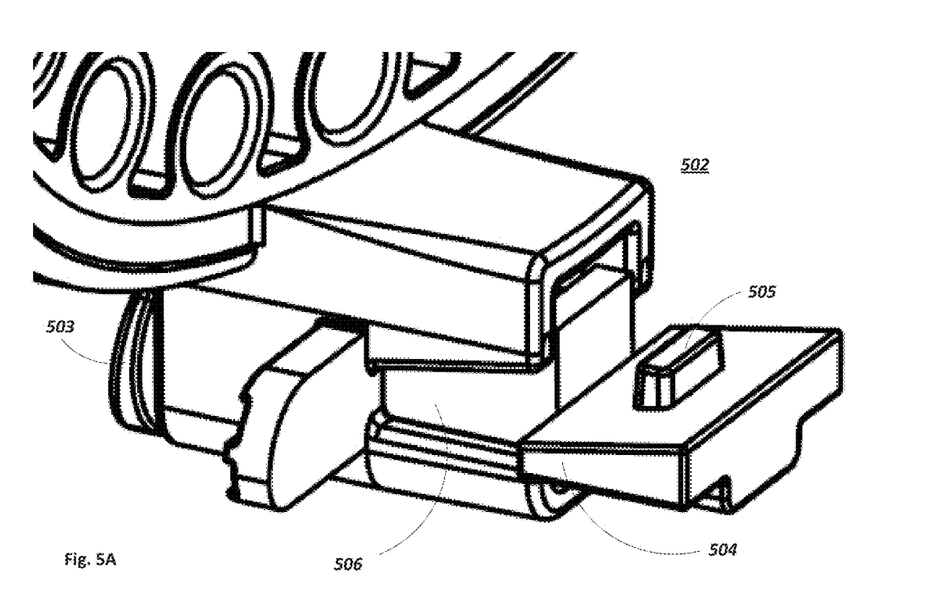
FIG. 5A: is an illustration of an exemplary connector, in accordance with some embodiments of the present invention.
Figure 5B:
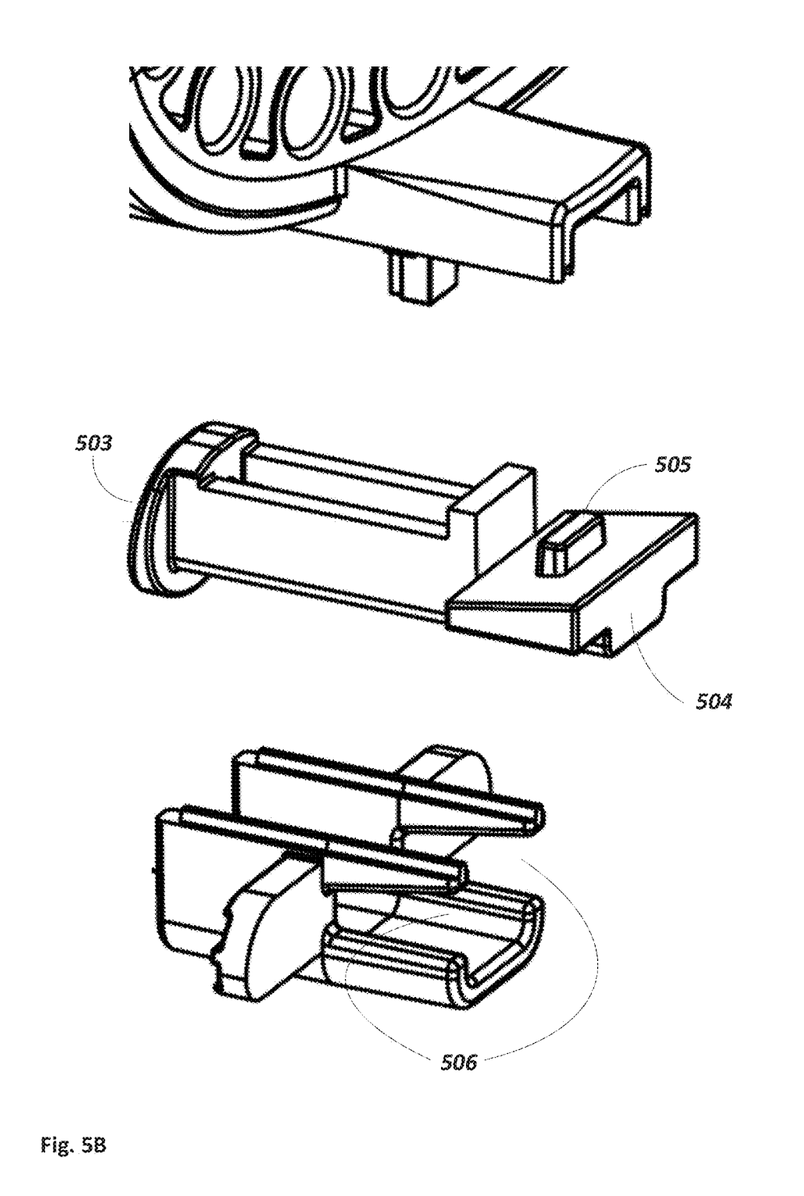
FIG. 5B: is an illustration of components of an exemplary connector, in accordance with some embodiments of the present invention.
Figure 6A:
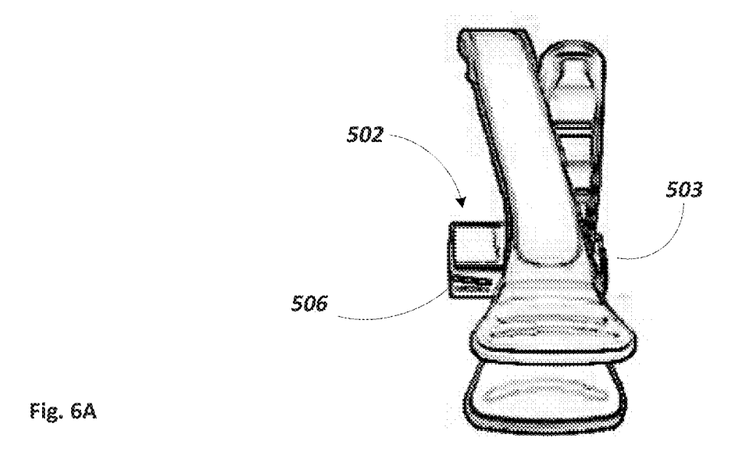
FIGS. 6A-6D: are illustrations of an exemplary process of connecting an exemplary receptacle mount to an exemplary connector affixed to an exemplary tail attachment element, all in accordance with some embodiments of the present invention.
Figure 6B:
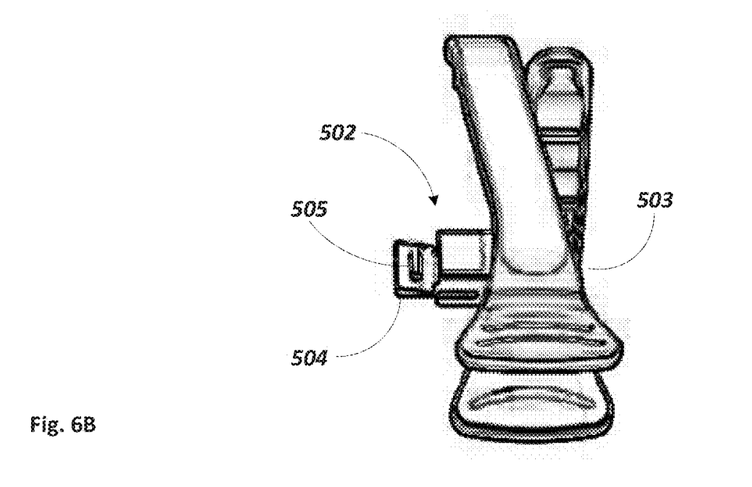
Figure 6C:
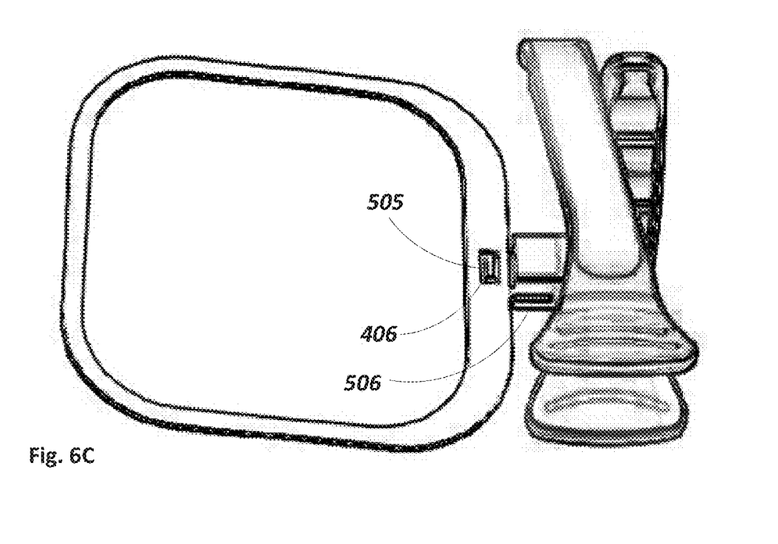
Figure 6D:
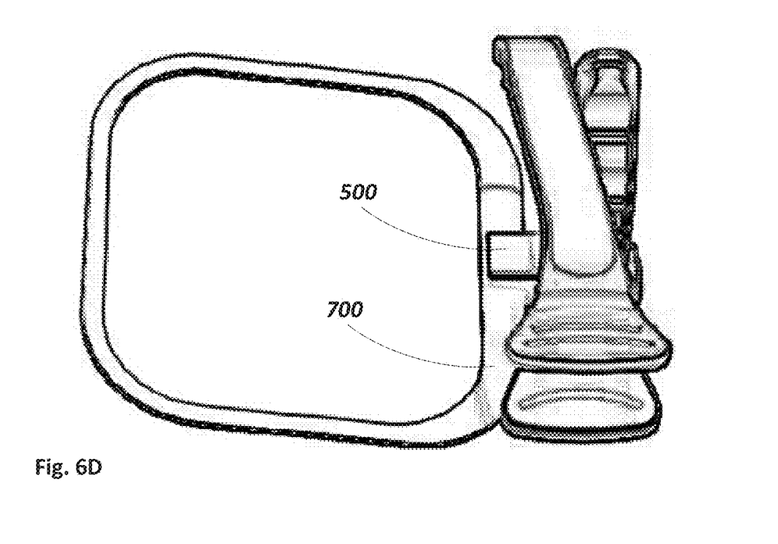
Figure 7:
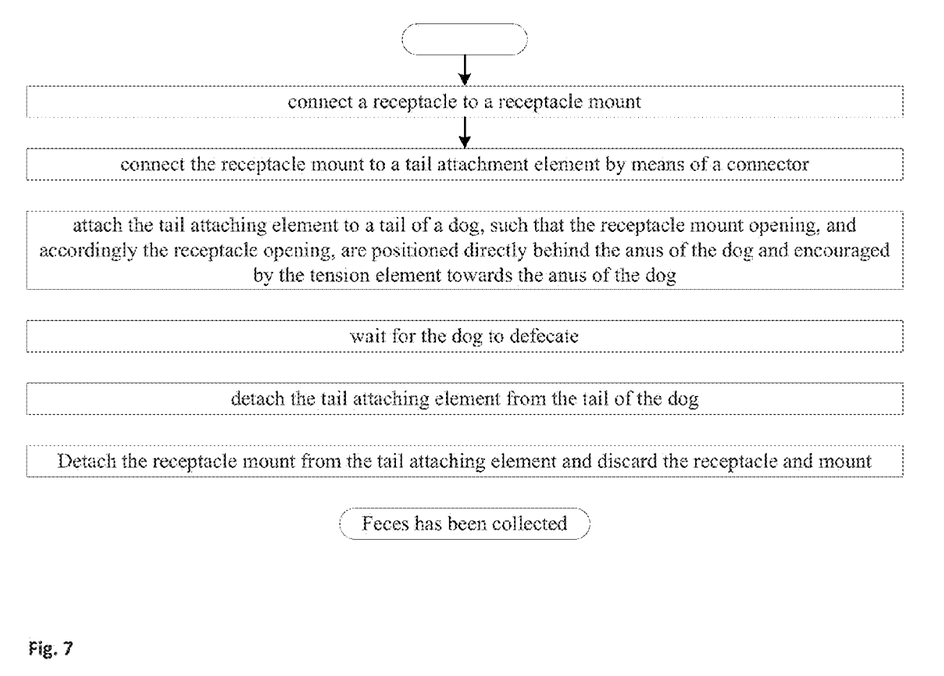
FIG. 7: is a flowchart including steps of an exemplary process of use of an exemplary piqapoo, all in accordance with some embodiments of the present invention.

According to some embodiments, there may be provided an apparatus for catching canine feces (hereinafter referred to as a "Piqapoo™") [see FIGS. 2A-2E]. A Piqapoo may be comprised of:

a. a tail attaching element designed to detachably attach to a tail of a dog. According to some embodiments a tail attachment element may attach to a dog tail by pressure. For example, a tail attaching element may comprise a clip [300] [see FIGS. 3A-3B]. as can be seen in FIGS. 3A-3B, such a clip (similar in function to a ladies hair-clip) may be comprised of 2 opposing "clipping" arms [301 & 302] connected towards one end by a tension element (e.g. a spring) [303], which tension element may be designed and configured to force the arms towards each other. Beyond the connection the arms may bend outwards to form two smaller arms [304], which smaller arms may serve to manually force the "clipping" arms apart, working against the tension element, thereby allowing the attachment of the tail attachment element to a tail of a dog. In other words, the "clipping" arms may be manually forced apart by pressing the smaller arms together, placed on two sides of the tail and released to clasp the dog tail. According to further embodiments, the inner sides of the "clipping" arms may include adaptations to better secure the tail attachment element to the tail and inhibit movement of the attachment element once attached to a tail. For example, the inner sides of the "clipping" arms may be comprised of a material with high friction (e.g. silicon or rubber) and/or the inner sides of the "clipping" arms may include protrusion or ridges designed to inhibit movement relative to a tail they are attached to. An example of such protrusions is illustrated in FIGS. 3A-3B [305]. In this example, these protrusions are implemented as small flexible circles of a rubber or silicon material. It should be understood that many types of adaptations designed to inhibit movement of the attaching element in relation to a tail it is attached to may be similarly implemented. According to yet further embodiments, as exemplified in FIGS. 3A-3B, the opposing arms may not be directly opposite each other, thereby further inhibiting movement of the attaching element in relation to a tail it is attached to. According to some embodiments, an attaching element may be fabricated from a rigid material (e.g. plastic) and/or slightly flexible material, as is best suited for its purpose;

b. a receptacle, possibly disposable, designed to receive and collect feces, e.g. a bag type receptacle [400] [401/402]. The receptacle may initially be in a folded/compact state [as shown in FIG. 4A] and enlarge when feces enters the receptacle [as shown in FIG. 4B], as needed (similar to a garbage bag). For example, as shown in FIGS. 4A-4B, a receptacle may be comprised of a folded bag [401] which can enlarge when feces enter the bag [402]. As should be clear from the above description and accompanying drawings, a receptacle may include an opening [403] on one end through which the feces can enter the receptacle, whereas the rest of the bag is enclosed. A receptacle may be fabricated from any suitable material, possibly a material which is impermeable to liquid and possibly further one that may prevent/inhibit odors from exiting the receptacle. According to yet further embodiments a receptacle may be of a color to match a color of a dog or have another design as desired. According to yet further embodiments, a receptacle (or other portions of a piqapoo) may be of fluorescent colors or include other light elements, for safety or to improve visibility of the dog. According to yet further embodiments, a receptacle may be designed to change its color or shade when feces enters the receptacle;

c. a receptacle mount designed to support/secure the receptacle. The receptacle mount may include an opening and may support/secure a receptacle such that the receptacle opening coincides with the receptacle mount opening. According to some embodiments, a receptacle mount may include adaptations to allow a disposable receptacle to be easily attached to it (such as described in parent application Ser. No. 13/681,683). In such embodiments, a different receptacle may be used for each use of the piqapoo, while the same mount is reused. According to further embodiments, the receptacle mount may also be disposable and further a receptacle may be manufactured and attached to a receptacle mount during fabrication (e.g. adhered), such that a user may purchase the receptacle mount and receptacle as a single disposable integral unit. Such an embodiment is illustrated in FIGS. 4A-4C. According to further embodiments, a receptacle mount may include adaptations to attach the mount to a tail attaching element or associated connector (as will be further described below). An example of a receptacle mount is presented in FIGS. 4A-4C [404]. In this example the mount is comprised of a flat square having an opening in its center [405] coinciding with the opening of a receptacle mounted upon it, and a flat area at its top including a small slit [406] designed to allow it to be detachably connected to a tail attachment element (as illustrated in FIGS. 6A-6D and further described below). In this example of a receptacle mount, as will be further described below, the mount also serves as a tension element designed to encourage the opening of the mount, and attached receptacle, towards the anus of a dog to which the piqapoo is attached.

d. a connecting element [see FIGS. 5A-5B] designed to detachably connect a receptacle mount to a tail attaching element, such that when the tail attaching element is attached to a tail of a dog and the receptacle mount is attached to the tail attaching element the receptacle mount opening, and accordingly the receptacle opening, are positioned directly behind the anus of the dog. According to some embodiments, a connecting element may be affixed to a tail attaching element, possibly during manufacture of the apparatus. According to some embodiments, a connecting element may include a manually actuatable mechanism for attaching and detaching a receptacle mount to a tail attachment element. According to further embodiments, such a mechanism may be spring based or otherwise tension based (e.g. by means of an elastic material). As explained above, however, a receptacle mount may be affixed to the connector and only the receptacle attached and detached during each use of the piqapoo. An example of a connecting element of a piqapoo [500] is illustrated in FIGS. 5A-5B. This exemplary connector correlates to the exemplary tail attachment element depicted in FIGS. 3A-3B and the exemplary receptacle mount depicted in FIGS. 4A-4B. As can be seen in FIGS. 2A-2E, this exemplary connector may be rigidly affixed to one arm of a tail attachment element. This exemplary connector may further include a manually actuatable spring based mechanism [502] for attaching the receptacle mount to the tail attachment element it is affixed to. As can be seen, this exemplary connector further includes a slot [506] into which the receptacle mount may be drawn into, thereby inhibiting lateral movement of the section of the mount inserted in the slot, positioning it at the appropriate angle in relation to connector. The process of attaching a mount to this exemplary connector is illustrated in FIGS. 6A-6D. In the first step [FIG. 6A] the mechanism [502] is opened by depressing a button [503] which causes a tongue [504] including a protrusion [505] to stick out of the connector [see FIG. 6B]. In this position, the top of the mount is positioned atop the tongue [504] such that the protrusion [505] enters the slit on the top of the exemplary mount [406] [see FIG. 6C]. Subsequently, the button [503] is released, causing the tongue [504] to retract, with the mount being pulled by the protrusion into the slot [see FIG. 6D]—the mount is now secured within the connector, with the protrusion [505] still inserted in the slit [406] preventing the mount from exiting the connector. According to further embodiments the slot [506] may be angled, as shown in the figures, to better position the mount receptacle in relation to the dog. It should be understood that many know mechanical mechanisms may be used to attach a mount to the connector. For further example, the connector may comprise a slot into which the mount is inserted. In this further example, a spring based protrusion within the connector slot may retract during the entrance of the mount and then enter the mount slit [406], again preventing the mount from exiting the connector. In such an embodiment, a button or similar mechanism may be provided to manually retract the protrusion again in order to release the mount for disposal;

e. a tension element [700] designed to encourage, by tension, the receptacle mount opening, and accordingly the receptacle opening, towards the anus of the dog. The tension element may be a separate element or it may be an integral part of the tail attaching element, the connecting element, or the receptacle mount. According to further embodiments, the tail attaching element, the connecting element, the receptacle mount or portions thereof, may be comprised of a flexible material, such that, by nature, they may serve as the tension element when attached in place. Such an embodiment is illustrated in the attached figures. In the illustrated exemplary embodiments the tension element is implemented as an integral portion of the receptacle mount. As can be seen, the illustrated receptacle mount has a wider flat portion at the top of the mount [700]. This portion, and possibly the entire mount, may be fabricated from a material having appropriate elastic properties (e.g. a suitable polymer or silicate) which allow the mount to bend, yet, while bent aspire to return to their original shape, thereby applying force against the object causing the mount to bend. In this manner the mount itself may serve as the tension element encouraging the mount opening towards the anus of the dog. As can be seen in FIG. 1, by appropriately positioning the connector and its slot, when attaching the exemplary piqapoo to a dog's tail, the rear of the dog forces the receptacle mount to bend outwards, while the slot prevents the top portion of the mount from corresponding movement. If the mount, particularly its top portion, is fabricated from an appropriate material (as described above), the mount will apply an opposing force resisting this deformation; this force may encourage the mount opening towards the anus of the dog. In this manner the mount is serving as a tension element encouraging the receptacle mount opening towards the anus of the dog. It should be understood that a similar result may be achieved by fabricating the connector, tail attaching element, portions thereof and/or combinations thereof from similar materials. It should further be understood that other tension applying elements (e.g. springs) may be implemented to achieve the same result.

According to some embodiments, dog feces may be collected by:

a. connecting a receptacle to a receptacle mount—as stated above, this step may be performed during manufacture of the product [as shown in FIG. 4A];

b. connecting the receptacle mount to a tail attachment element, possibly by means of a connector as described above [as shown in FIGS. 6A-6D];

c. attaching the tail attaching element to a tail of a dog, such that the receptacle mount opening, and accordingly the receptacle opening, are positioned directly behind the anus of the dog and encouraged by the tension element towards the anus of the dog [as shown in FIG. 1];

d. waiting for the dog to defecate—upon the dog defecating the excrement will enter the receptacle which will in turn enlarge to the necessary proportions and collect the feces;

e. detaching the tail attaching element from the tail of the dog;

f. detaching the receptacle mount from the tail attaching element and discarding the receptacle and mount.

The present invention can be practiced by employing conventional tools, methodology and components. Accordingly, the details of any such tool, component and methodology are not set forth herein in detail. In the previous descriptions, numerous specific details are set forth, in order to provide a thorough understanding of the present invention. However, it should be recognized that the present invention may be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. It should be understood that the above exemplary embodiments are intended solely to exemplify the principles and teachings of the present invention and therefore, should not be considered to encompass the full scope of the present invention in any way. It should be clear to anyone of ordinary skill in the art that many other examples of the present invention are possible.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A canine feces collection assembly comprising:
   a feces receptacle having an opening positioned to receive feces into said receptacle; and
   a receptacle mount comprising: (1) an opening and (2) a tension element comprised of an elastic component, said mount being designed to support said feces receptacle such that said receptacle opening and said receptacle mount opening coincide to form one opening positioned to receive feces into said receptacle;
   a connecting element functionally associated with said receptacle mount or being a component of said receptacle mount and designed to connect said receptacle mount to a tail attaching element;
   wherein said receptacle mount is designed such that when connected to the tail attachment element and the tail attachment element is attached to a tail of a dog, at or near the base of the tail, the one opening is positioned directly behind an anus of the dog and the tension element is deformed such that it applies an elastic force upon the one opening forcing the one opening towards the anus of the dog.

2. The assembly according to claim 1, wherein said tension element is implemented by fabricating said receptacle mount, or a portion of said receptacle mount, from an elastic material.

3. The assembly according to claim 1, wherein said receptacle is colored to match a color typical of dogs.

4. The assembly according to claim 1, wherein said connecting element is a slit in the receptacle mount.

5. The assembly according to claim 1, wherein said receptacle mount is substantially flat.

6. The assembly according to claim 1, wherein said receptacle mount is a single piece of a polymer material.

7. The assembly according to claim 1, wherein said receptacle is affixed to said receptacle mount during manufacture.

8. An assembly for collection of canine feces, comprising:
   a tail attaching element designed to attach to a tail of a dog by pressure, at or near the base of the tail;
   a feces receptacle having an opening positioned to receive feces into said receptacle;
   a receptacle mount comprising: (1) an opening and (2) a tension element comprised of an elastic component, said mount being designed to support said feces receptacle such that said receptacle opening and said receptacle mount opening coincide to form one opening positioned to receive feces into said receptacle; and a connector designed to connect said receptacle mount to said tail attaching element;

wherein said assembly is designed such that when said receptacle mount is connected to said tail attaching element by said connector and said tail attaching element is attached to the tail of the dog, at or near the base of the tail, the one opening is positioned directly behind an anus of the dog and the tension element is deformed such that it applies an elastic force upon the one opening forcing the one opening towards the anus of the dog.

9. The assembly according to claim 8, wherein said tension element is implemented by fabricating said receptacle mount, or a portion of said receptacle mount, from an elastic material.

10. The assembly according to claim 8, wherein said tail attaching element comprises a clip comprised of two opposing arms.

11. The assembly according to claim 10, wherein at least one of said two opposing arms include protrusions.

12. The assembly according to claim 10, wherein said two opposing arms are aligned on different planes.

13. The assembly according to claim 8, wherein said connector includes a spring based mechanical mechanism designed to disconnect said receptacle mount from said tail attaching element.

14. The assembly according to claim 8, wherein said receptacle is colored to match a color typical of dogs.

15. The assembly according to claim 8, wherein said receptacle mount comprises a slit and said connector connects said receptacle mount to said tail attaching element by means of said slit.

16. The assembly according to claim 8, wherein said receptacle mount is substantially flat.

17. The assembly according to claim 8, wherein said receptacle mount is a single piece of a polymer material.

18. The assembly according to claim 8, wherein said receptacle is affixed to said receptacle mount during manufacture.

* * * * *